(12) United States Patent
Bogusky

(10) Patent No.: US 10,935,810 B2
(45) Date of Patent: Mar. 2, 2021

(54) EYEGLASS RETENTION SYSTEM AND METHOD

(71) Applicant: Stiffys Optics, Co., Boulder, CO (US)

(72) Inventor: Alexander M. Bogusky, Boulder, CO (US)

(73) Assignee: Stiffys Optics, Co., Boulder, CO (US)

( * ) Notice: Subject to any disclaimer, the term of this patent is extended or adjusted under 35 U.S.C. 154(b) by 170 days.

(21) Appl. No.: 16/366,798

(22) Filed: Mar. 27, 2019

(65) Prior Publication Data

US 2019/0302474 A1 Oct. 3, 2019

Related U.S. Application Data

(60) Provisional application No. 62/655,686, filed on Apr. 10, 2018, provisional application No. 62/650,802, filed on Mar. 30, 2018.

(51) Int. Cl.
*G02C 3/00* (2006.01)
*G02C 5/14* (2006.01)

(52) U.S. Cl.
CPC ............ *G02C 3/006* (2013.01); *G02C 5/143* (2013.01)

(58) Field of Classification Search
CPC ........ G02C 5/143; G02C 11/10; G02C 11/00; G02C 5/14; G02C 2200/02; G02C 5/146; G02C 11/02; G02C 2200/08; G02C 5/008; G02C 5/22; G02C 2200/04; G02C 5/00; G02C 5/20; G02C 3/003; G02C 3/04; G02C 5/001; G02C 3/006; G02C 5/006; G02C 5/10; G02C 5/2209; G02C 5/2227; G02C 5/2263; G02C 11/08; G02C 1/02; G02C 1/08; G02C 2200/06; G02C 2200/18; G02C 2200/20; G02C 2200/26; G02C 5/02; G02C 5/16; G02C 7/101; G02C 11/06;
(Continued)

(56) References Cited

U.S. PATENT DOCUMENTS 3,582,194 A 6/1971 Liautaud
6,547,388 B1 4/2003 Bohn
(Continued)

*Primary Examiner* — Collin X Beatty
*Assistant Examiner* — Grant A Gagnon
(74) *Attorney, Agent, or Firm* — Adsero IP

(57) ABSTRACT

An eye glass retention system that includes an eyeglass frame comprising a lens frame and first and second temple arms attached at a proximal end to the lens frame at opposing ends of the lens frame. At least one of the first and second temple arms has a temple arm cavity extending lengthwise of at least a portion of the at least one temple arm with a distal opening proximate a distal end of the at least one temple arm. A central post resides within the temple arm cavity extending axially of the temple arm cavity with a space surrounding the central post between the central post and an interior wall of the temple arm cavity. A retention band has a first and a second end. At least one of the first and second ends has an opening into a retention band cavity defined by a retention band sidewall extending lengthwise of at least a portion of the retention band. The retention band is configured so that the inner surface of the sidewall contracts inward when subject to axial tension and expands outward when subject to axial compression. The central post within the temple arm cavity is received in the retention band cavity through the opening of the retention band cavity and the retention band sidewall is received in the space surrounding the central post.

10 Claims, 3 Drawing Sheets

(58) Field of Classification Search
CPC ........ G02C 11/12; G02C 13/001; G02C 1/04;
G02C 1/06; G02C 2200/10; G02C
2200/16; G02C 2200/30; G02C 5/12;
G02C 5/18; G02C 5/2236; G02C 7/02;
G02C 7/081; G02C 7/083; G02C 7/10;
G02C 7/16; G02C 11/04; G02C 1/10;
G02C 2200/14; G02C 2200/22; G02C
2200/24; G02C 2200/28; G02C 2200/32;
G02C 2202/20; G02C 5/04; G02C 5/06;
G02C 5/126; G02C 5/2218; G02C
5/2272; G02C 5/2281; G02C 5/229;
G02C 7/022; G02C 7/06; G02C 7/08;
G02C 7/086; G02C 7/088; G02C 7/14;
G02C 7/165; G02C 9/00; G02C 9/02
USPC ......................................................... 351/111
See application file for complete search history.

(56) References Cited

U.S. PATENT DOCUMENTS

| | | |
|---|---|---|
| 6,905,206 B2 | 6/2005 | Skuro |
| 7,399,079 B2 | 7/2008 | Skuro |
| 7,581,834 B1 | 9/2009 | Courville |
| 7,828,429 B2 | 11/2010 | Spinato |
| 2004/0051845 A1 | 3/2004 | Steere |

EYEGLASS RETENTION SYSTEM AND METHOD

RELATED APPLICATIONS

This application claims priority from U.S. Provisional Patent Application Ser. Nos. 62/655,686, filed Apr. 10, 2018, and 62/650,802, filed Mar. 30, 2018, each entitled "Eyeglass Retention System and Method," each of which is hereby incorporated by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present disclosure is directed to eyeglasses, and more particularly to a retention system and method for eyeglasses.

BACKGROUND

Eyeglass retention systems of various kinds are well known in the art. Most common are retention bands that receive the distal end of eyeglass temple arms in an opening of a lengthwise cavity. Often the cavity is lined with a high friction material such as rubber or other elastomers to retain the distal end of the temple arms in the cavity. One problem with this structure is the length of the retention band is not readily adjustable. Also known in the art are glasses having hollow arms with retractable/extendable bands received therein. Examples are Bohn, U.S. Pat. No. 6,547,388 and Steere, U.S. Pub. No. 2004/0051845. However, these structures are relatively complex and thus add considerable cost and bulk to eyeglass frames. Courville, U.S. Pat. No. 7,581,834 shows a removable retention band received in a partially hollow temple piece. While a simpler solution than that of Bohn and Steere, Courville requires a cap 7 that mates with the frame to retain the band. To adjust the length of the band the cap must be removed, then the band cut to a desired length and then the cap is replaced on the band end before mating the cap back with the frame, a cumbersome process. Skuro, U.S. Pat. No. 6,905,206 and Skuro, U.S. Pat. No. 7,399,079 each show an extendable/retractable band with spring retractors and slidable braking blocks received in hollow temple pieces. Thus, each require the relatively complex and bulky retractor/braking block structure to provide adjustability.

The present invention is directed toward overcoming one or more of the problems discussed above.

SUMMARY OF THE EMBODIMENTS

A first aspect of the disclosure is an eye glass retention system that includes eyeglasses comprising a lens frame and first and second temple arms attached at a proximal end to the lens frame at opposing ends of the lens frame. At least one of the first and second temple arms has a temple arm cavity extending lengthwise of at least a portion of the at least one temple arm with a distal opening proximate a distal end of the at least one temple arm. A central post resides within the temple arm cavity extending actually of the temple arm cavity with a space surrounding the central post between the central post and an interior wall of the temple arm cavity. A retention band has a first and a second end. At least one of the first and second ends has an opening into a retention band cavity defined by a retention band sidewall extending lengthwise of at least a portion of the retention band. The retention band is configured so that the inner surface of the sidewall contracts inward when subject to axial tension and expands outward when subject to axial compression. The central post within the temple arm cavity is received in the retention band cavity through the opening of the retention band cavity and the retention band sidewall is received in the space surrounding the central post.

Embodiments can include each of the temple arms having a temple arm cavity with a distal opening proximate the distal end of the temple arm with a central post therein and each of the first and second retention band ends having an opening into a retention band cavity. The central post within each temple arm cavity is received in the retention band cavity through the opening of the retention band cavity at one of the first and second retention band ends.

Embodiments can include one of a hinge, a living hinge or no hinge between opposing ends of the lens frame and the first and second temple arms.

Embodiments can include the retention band cavity extending the entire length of the retention band. The retention band may be made of an elastomeric material or may be made of woven material. In embodiments where the retention band is made of woven material, the woven material may be inelastic. Embodiments may include the central post being cylindrical and the retention band cavity being cylindrical.

Another aspect of the disclosure is a method of retaining eyeglasses that includes providing a pair of eyeglasses as described above with a retention band attached to a central post at the distal end of at least one of the temple arms as described above. A length of the retention band can be shortened by removing the end of the retention band from the central post by grasping the retention band at the distal end of the temple arm and axially pulling the retention band from the central post. Thereafter a select segment of the retention band can be cut from the end of the retention band to form a desired length of the retention band. The central post is then inserted in the opening of the retention band cavity with the retention band sidewall received in the space surrounding the central post and the retention band is axially compressed to receive the central post in the retention band cavity.

The various aspects and embodiments provide an eyeglass retention system that allows for quick and easy customization of the length of the retention band. The eyeglass retention system is elegant in its simplicity and mode of operation, reliable and aesthetically pleasing.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

While various aspects and features of certain embodiments have been summarized above, the following detailed description illustrates a few embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
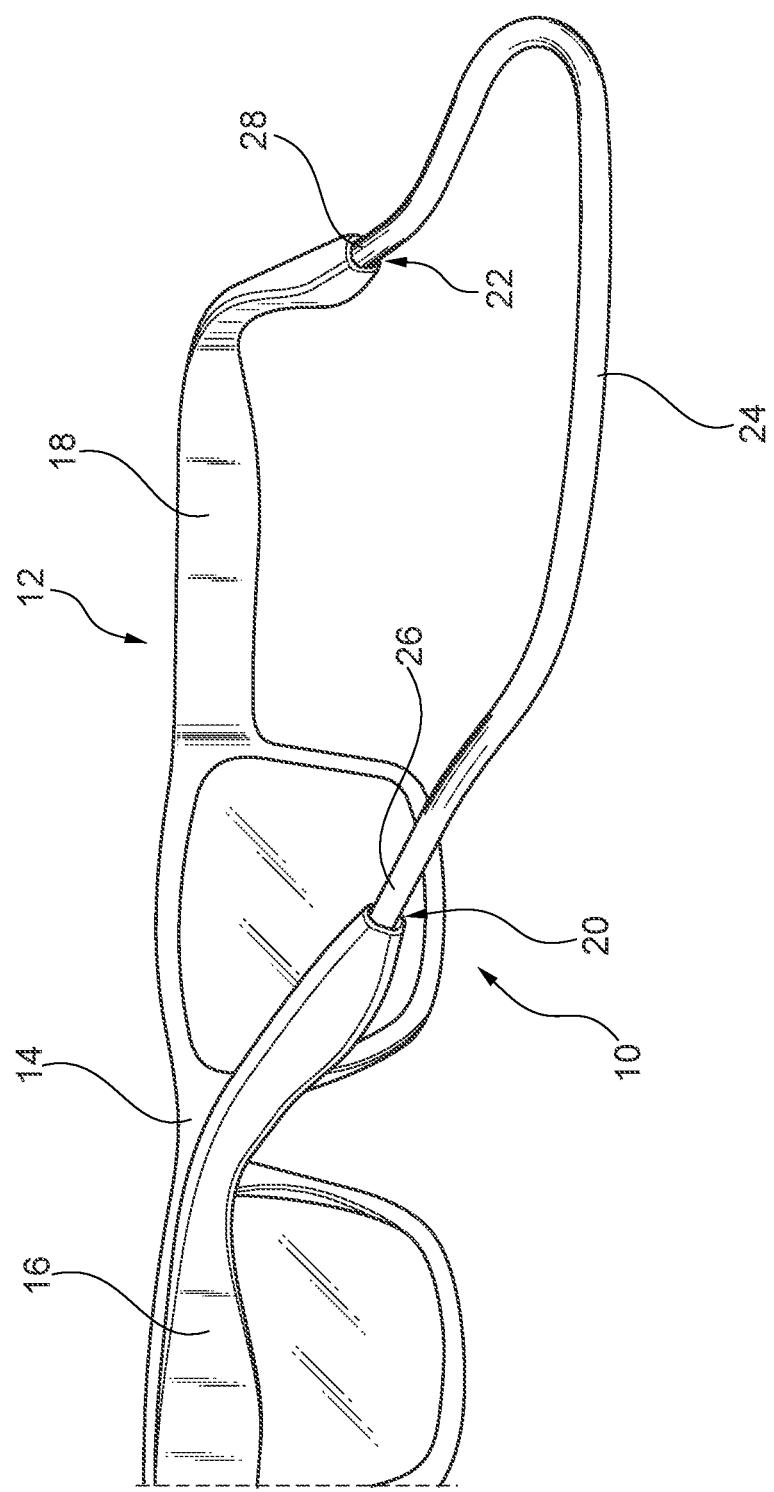
FIG. 1 is a perspective view of an eyeglass retention system of the present invention in an assembled state.
Figure 2:
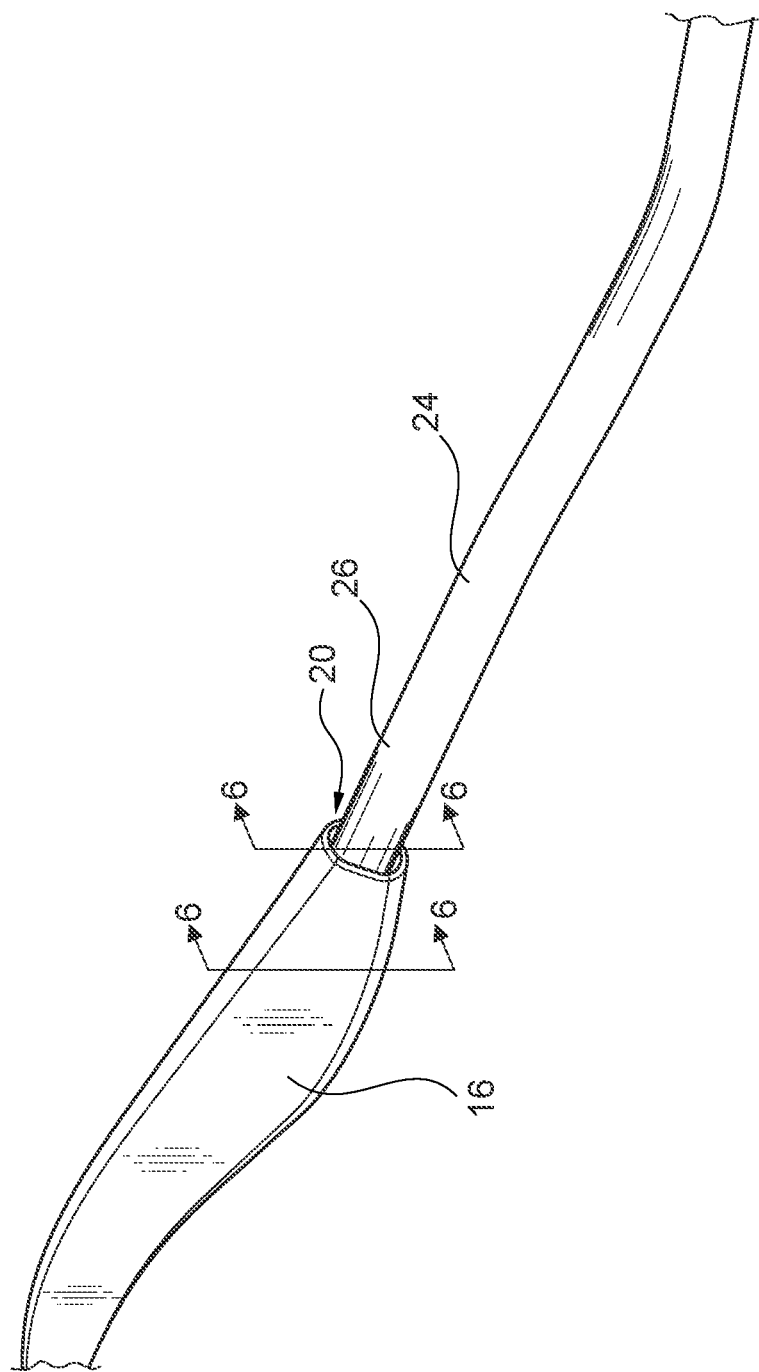
FIG. 2 is an enlarged perspective view of a portion of FIG. 1 showing a retention band received in an opening of a temple arm cavity.

An eyeglass retention system 10 is shown in a perspective view in FIG. 1. The eyeglass retention system includes an eyeglass frame 12 having a lens frame 14 and first and second temple arms 16, 18 attached at a proximal end to opposing ends of the lens frame 14. In the embodiment illustrated in FIG. 1, the temple arms 16, 18 extend substantially perpendicularly from the lens frame and are attached to the lens frame 14 without a hinge therebetween. Alternative embodiments could include a living hinge or a conventional hinge between the proximal ends of the temple arms 16, 18 and the lens frame 14. At a distal end of each temple arm is a temple arm cavity opening 20, 22. A retention band 24 has a first end 26 and a second end 28 received in each of the temple arm cavity openings 20, 22. FIG. 2 is an enlarged portion of FIG. 1 showing the distal end of the temple arm 16 with the temple arm cavity opening receiving the first end 26 of the retention band 24.

Figure 3:
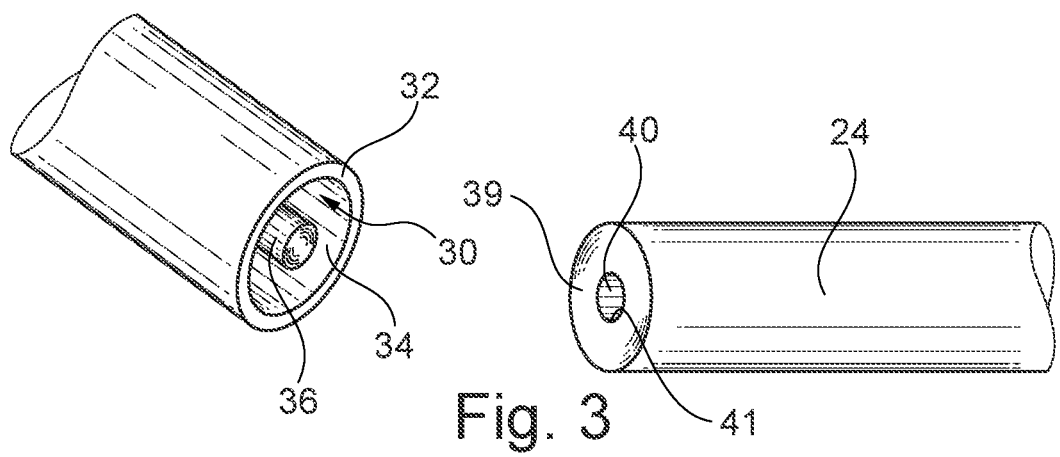
FIG. 3 is a perspective view of the eyeglass retention system of FIG. 1 showing an opening of a temple arm cavity with a mating retention band end positioned to receive the central post of the temple arm cavity.

FIG. 3 illustrates in greater detail how the first ends 26, 28 of the retention band 24 are received in the temple arm cavity openings 20, 22. FIG. 3 shows a temple arm cavity 30. The temple arm cavity 30 is defined by a wall 32 having an interior surface 34. A central post 36 extends along an axis of the cavity 30 with a space surrounding the central post 36 between the central post 36 and an interior surface 34 of the wall 32. See also FIG. 6.

Figure 4:
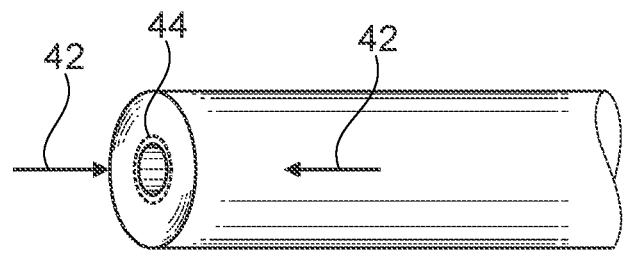
FIG. 4 is a perspective view of a retention band end of FIG. 1 subjected to a compressive force.
Figure 5:
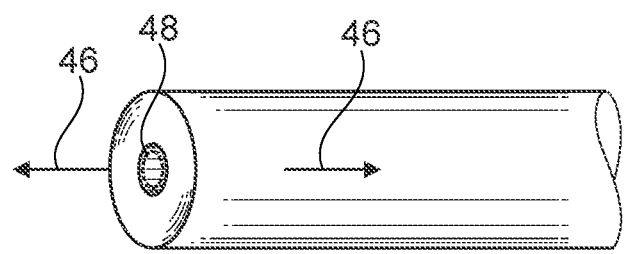
FIG. 5 is a perspective view of a retention band end of FIG. 1 subjected to an axial tensile force.
Figure 6:
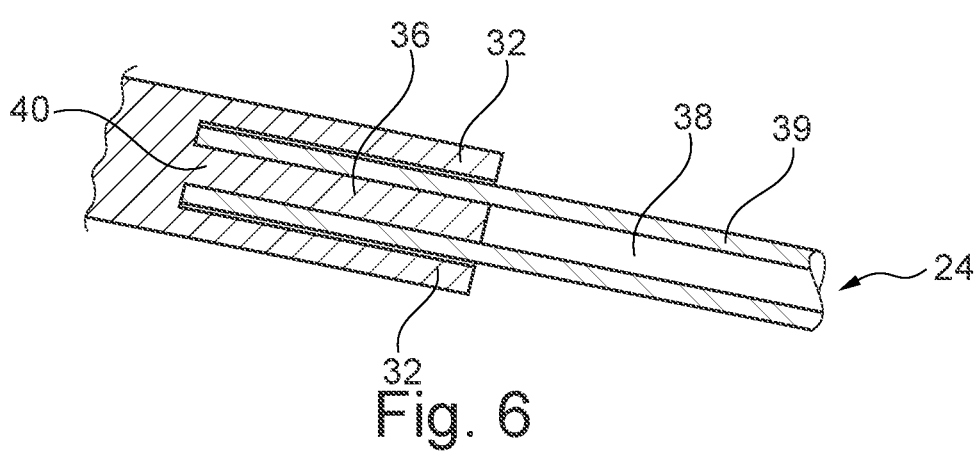
FIG. 6 is a sectional view taken along lines 6-6 of FIG. 2.

FIGS. 3 and 6 further illustrate the retention band 24. In the present embodiment, the retention band 24 has a retention band cavity 38 within a retention band wall 39 extending the length of the retention band 24 between openings 40 into the retention band cavity at the first and second ends 26, 28 of the retention band 24. The retention band 24 is configured so that an interior surface of the retention band sidewall 41 contracts inward when the retention band 24 subject to axial tension and expands outward when the retention band 24 is subject to axial compression. This is illustrated in FIG. 4 where an axial compressive force is represented by the arrows 42 causes the wall interior to expand outward as shown in broken lines 44 and in FIG. 5 where an axial tension force is represented by the arrows 46 causing the wall interior to contract inward as shown in broken line 48. In some embodiments this property comes from the retention band 24 being made of an elastomeric material such as, by way of a non-limiting example, rubber or latex. In other embodiments the property can come from the retention band being made of a woven elastomeric or inelastic material.

The retention system is dimensioned so that in a relaxed state the retention band cavity 38 has an interior cross-section slightly smaller than an exterior cross-section of the central post 36. To attach the ends of the retention band 24 to the central post 36, the distal end of the central post 36 is inserted into the opening 40 of the retention band cavity 38 and an axial compressive force as represented by the arrows 42 is applied near the ends of the retention band 24 causing an expansion of the wall interior so that the central post 36 can slide into the retention band cavity 38. The retention band wall 39 is received in the space between the central post and the temple arm wall interior surface 34. Once attached, axially pulling on the retention band 24 creates the tension force represented by the arrows 46 of FIG. 5, causing contraction of the interior surface of the retention band wall 39, thus making it more difficult to remove the retention band 24 from the central post 36. The retention band 24 is removed from the central post 36 by a user grasping the retention band at the distal end of the temple arm 16 or 18 and axially pulling the retention band 24 from the central post by application of a sustained tension force in the direction of arrows 46. The retention band cavity 38 must be dimensioned relative to the central post 36 so that the force necessary to remove the retention band 24 from the central post 36 exceeds the weight of the glasses and so that with the retention band 24 around the back of a user's neck and the eyeglasses 12 hanging on the user's chest, the eyeglasses 12 remain attached to the retention band under typical incidental loads applied to the eyeglasses in normal use.

Embodiments may include the retention band cavity 38 having an interior cross-section equal to or slightly larger (e.g., 0.1 mm) than an exterior cross-section of the central post 36. As a non-limiting example, both the retention band cavity and the central post 36 can be cylindrical.

A method of retaining eyeglasses using the retaining system 10 as described above includes removing one end of the retention band 24 from a central post 36 in the temple arm cavity 30 by grasping the retention band 24 at a distal end the temple arm 16 or 18 and axially pulling the retention band 24 from the central post 36. The retention band 24 can then be cut to a desired length by cutting a select segment of the retention band 24 from the end of the retention band 24. The end 26 or 28 of the retention band 24 is then reattached to the temple arm 16 or 18 by axially inserting the central post 36 within the temple arm cavity in the opening 40 of the retention band cavity 38 with the retention band wall 39 received in the space surrounding the central post 36 and axially compressing a length of the retention band 24 near its end to receive the central post 36 in the retention band cavity 38.

EXAMPLE

As an example of one embodiment, the central post 36 is made of stainless steel having a circular cross-section with outer diameter of 1.6 mm and a length of 12 mm. The retention band 24 has a circular cross-section and is made of latex having an outer diameter of 3.2 mm and the retention band cavity 38 has a circular cross-section having an inner diameter of 1.6 mm. In use with this example, the retention band preferably covers substantially the entire length of the central post (e.g., about 10 mm or more) when the central post is received in the retention band cavity. Anodized aluminum and various plastics may also be suitable material for the central post 36, though the choice of materials may affect the relative dimensions between the retention band cavity 38 and the central post 36.

The description of the various embodiments has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiments described and shown in the figures were chosen and described in order to explain the principles of the invention, the practical application, and to enable others of ordinary skill in the art to understand the invention for various embodiments with various modifications as are suited to the particular use contemplated. All references cited herein are incorporated in their entirety by reference.

What is claimed is:

1. An eyeglass retention system comprising:
   an eyeglass frame comprising a lens frame and first and second temple arms attached at a proximal end to the lens frame at opposing ends of the lens frame, at least one of the first and second temple arms having a temple arm cavity extending lengthwise of at least a portion of the at least one temple arm with distal opening proximate a distal end of the at least one temple arm and a central post within the temple arm cavity extending axially of the temple arm cavity with space surrounding the central post between the central post and an interior wall of the temple arm cavity; and
   a retention band having a first and a second end, at least one of the first and second ends having an opening into a retention band cavity defined by a retention band sidewall extending lengthwise of at least a portion of the retention band, the retention band being configured so that the sidewall contracts inward when subject to axial tension and expands outward when subject to axial compression;
   wherein the central post within the temple arm cavity is received within the opening of the retention band cavity and the retention band sidewall is received in the space surrounding the central post.

2. The eyeglass retention system of claim 1 further comprising each of the temple arms having a temple arm cavity with a distal opening proximate the distal end of the temple arm with a central post therein and each of first and second ends of the retention band having an opening into a retention band cavity and wherein the central post within each temple arm cavity is received within one of the openings at the first and second ends of the retention band cavities.

3. The eyeglass retention system of claim 1 wherein the there is one of a hinge, a living hinge or no hinge between opposing ends of the lens frame and the first and second temple arms.

4. The eyeglass retention system of claim 1 wherein there is no hinge between opposing ends of the lens frame and the first and second temple arms, the temple arms extending substantially perpendicularly from the lens frame.

5. The eyeglass retention system of claim 2 wherein the retention band cavity extends the length of the retention band.

6. The eyeglass retention system of claim 5 wherein the retention band is made of an elastomeric material.

7. The eyeglass retention system of claim 5 wherein the retention band is made of woven material.

8. The eyeglass retention system of claim 7 wherein the retention band is made of an inelastic woven material.

9. The eyeglass retention system of claim 1 wherein the central post is cylindrical and the retention band cavity is cylindrical.

10. A method of retaining eyeglasses comprising:
    providing an eyeglass frame comprising a lens frame and first and second temple arms attached at a proximal end to the lens frame at opposing ends of the lens frame, at least one of the first and second temple arms having a temple arm cavity extending lengthwise of at least a portion of the at least one temple arm with distal opening proximate a distal end of the at least one temple arm and a central post within the temple arm cavity extending axially of the temple arm cavity with space surrounding the central post between the central post and an interior wall of the temple arm cavity; and
    a retention band having a first and a second end, at least one of the first and second ends having an opening into a retention band cavity defined by a retention band sidewall extending lengthwise of at least a portion of the retention band, the retention band being configured so that the sidewall contracts inward when subject to axial tension and expands outward when subject to axial compression;
    wherein the central post within the temple arm cavity is received within the opening of the retention band cavity and the retention band sidewall is received in the space surrounding the central post;
    removing the at least one of the first and second ends of the retention band from the central post by grasping the retention band at the distal end of the at least one temple arm and axially pulling the retention band from the central post;

cutting a select segment of the retention band from the at least one of the first and second ends of the retention band to form a desired length of the retention band; and axially inserting the central post within the temple arm cavity in the opening of the retention band cavity with the retention band sidewall received in the space surrounding the central post and axially compressing the retention band to receive the central post in the retention band cavity.

\* \* \* \* \*